United States Patent
Tukmanov et al.

(10) Patent No.: US 11,071,034 B2
(45) Date of Patent: Jul. 20, 2021

(54) MOVING CELL BACKHAUL COORDINATION

(71) Applicant: BRITISH TELECOMMUNICATIONS PUBLIC LIMITED COMPANY, London (GB)

(72) Inventors: Anvar Tukmanov, London (GB); Aygul Garifullina, London (GB)

(73) Assignee: British Telecommunications Public Limited Company, London (GB)

( * ) Notice: Subject to any disclaimer, the term of this patent is extended or adjusted under 35 U.S.C. 154(b) by 0 days.

(21) Appl. No.: 16/637,080

(22) PCT Filed: Jul. 27, 2018

(86) PCT No.: PCT/EP2018/070452
§ 371 (c)(1),
(2) Date: Feb. 6, 2020

(87) PCT Pub. No.: WO2019/034391
PCT Pub. Date: Feb. 21, 2019

(65) Prior Publication Data
US 2020/0252851 A1 Aug. 6, 2020

(30) Foreign Application Priority Data
Aug. 15, 2017 (EP) .................................. 17186327

(51) Int. Cl.
*H04W 36/32* (2009.01)
*H04W 76/10* (2018.01)
(Continued)

(52) U.S. Cl.
CPC .......... *H04W 36/32* (2013.01); *G05D 1/0212* (2013.01); *G05D 1/0285* (2013.01);
(Continued)

(58) Field of Classification Search
CPC . H04W 84/04; H04W 84/047; H04W 84/005; H04W 24/02; H04W 88/06;
(Continued)

(56) References Cited

U.S. PATENT DOCUMENTS 4,842,221 A 6/1989 Beach et al.
6,325,330 B1 12/2001 Lavan, Jr.
(Continued)

FOREIGN PATENT DOCUMENTS

CN 105083520 A 11/2015
EP 2485516 A1 8/2012
(Continued)

OTHER PUBLICATIONS

Lambrou, Theofanis, P., *Distributed Collaborative Path Planning in Sensor Networks with Multiple Mobile Sensor Nodes*, 17th Mediterranean Conference on Control & Automation, Jun. 24-26, 2009, 6 pages.
(Continued)

*Primary Examiner* — Anthony R Jimenez
(74) *Attorney, Agent, or Firm* — Patterson Thuente Pedersen, P.A.

(57) ABSTRACT

An autonomous vehicle having wireless access communications access point equipment is arranged to set up a base station in a coverage "hole" by scanning to detect transmissions from another wireless communications access point, and determines a direction in which quality of coverage from the other wireless communications access point decreases, and directs the autonomous vehicle to move in the direction of decreasing coverage until it reaches a limit of coverage, at which point it hands over to another base station or, if no further base station is available, sets up as a wireless communications point connecting through the last base station to a backhaul connection.

15 Claims, 5 Drawing Sheets

Figure 1:
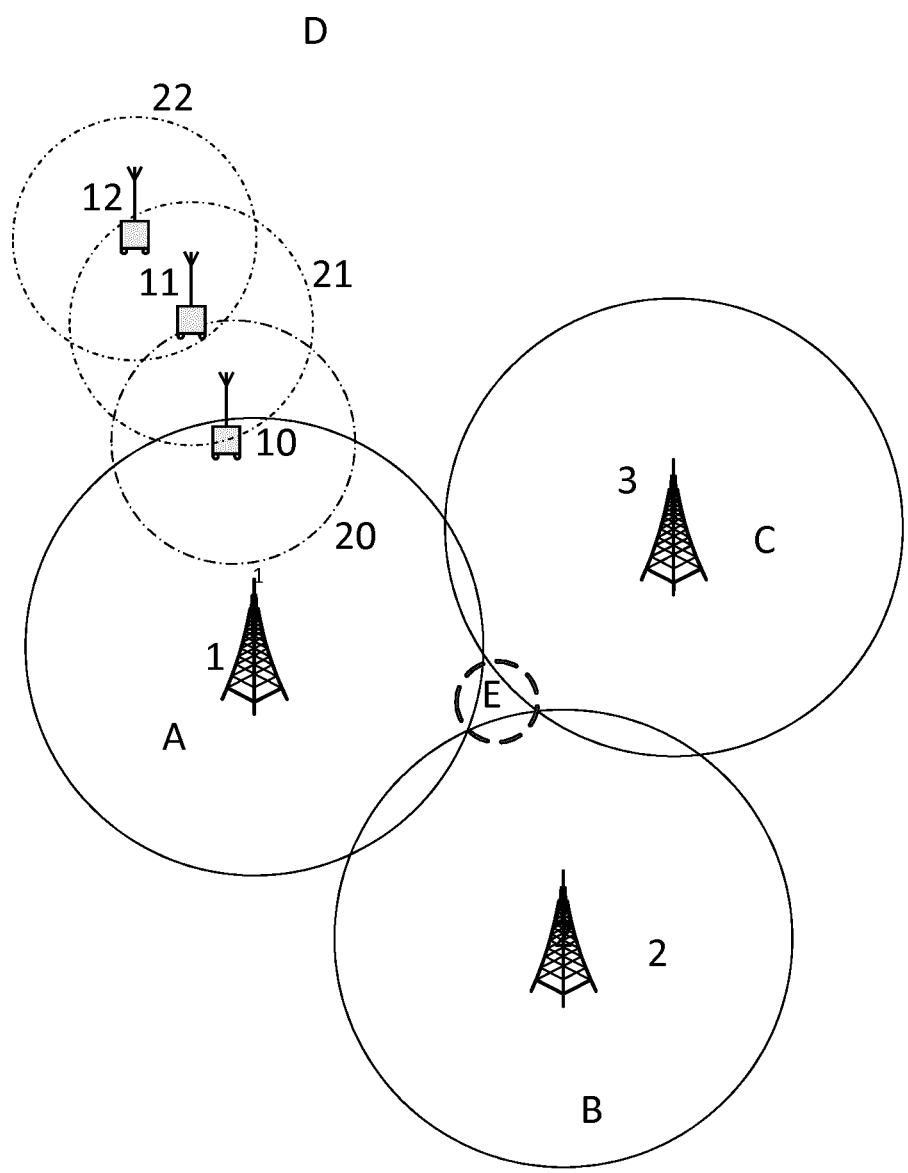

(51) Int. Cl.
*G05D 1/02* (2020.01)
*H04B 7/155* (2006.01)
*H04W 36/08* (2009.01)
*H04W 64/00* (2009.01)
*H04W 88/08* (2009.01)

(52) U.S. Cl.
CPC ........ *H04B 7/15507* (2013.01); *H04W 36/08* (2013.01); *H04W 64/003* (2013.01); *H04W 76/10* (2018.02); *G05D 2201/0213* (2013.01); *H04W 88/08* (2013.01)

(58) Field of Classification Search
CPC ... H04W 88/08; H04W 16/26; H04W 64/003; H04W 76/10; H04W 36/08; H04W 36/14; H04W 36/32; H04W 16/14; H04W 72/00; H04W 72/04; H04W 72/0453; H04W 15/8016; H04B 7/185; H04B 7/0413; H04B 7/18504; H04B 7/06177; H04B 7/15507; B64C 39/02; B61L 15/0036; B61L 15/0027; B61L 27/0005; H04L 67/12; B61K 13/00; H04M 15/00; G06Q 50/188; G06Q 30/0631; G05D 1/0212; G05D 1/0213; G05D 1/0285
USPC ........................................................ 701/25
See application file for complete search history.

(56) References Cited

U.S. PATENT DOCUMENTS

| | | | |
|---|---|---|---|
| 8,068,937 | B2 | 11/2011 | Eaves |
| 8,781,637 | B2 | 7/2014 | Eaves |
| 9,184,795 | B2 | 11/2015 | Eaves |
| 2005/0227696 | A1 | 10/2005 | Kaplan et al. |
| 2006/0164318 | A1* | 7/2006 | Lastinger ............... H01Q 25/00 343/841 |
| 2007/0200027 | A1 | 8/2007 | Johnson |
| 2008/0002626 | A1 | 1/2008 | Yokoyama |
| 2009/0204268 | A1 | 8/2009 | Eaves |
| 2011/0244863 | A1 | 10/2011 | Matsuo et al. |
| 2012/0075759 | A1 | 3/2012 | Eaves |
| 2012/0155377 | A1 | 6/2012 | Chai |
| 2012/0225628 | A1 | 9/2012 | Ho et al. |
| 2012/0252453 | A1 | 10/2012 | Nagaraja et al. |
| 2013/0103220 | A1 | 4/2013 | Eaves |
| 2014/0233412 | A1 | 8/2014 | Mishra et al. |
| 2014/0274064 | A1 | 9/2014 | Al-Shalash et al. |
| 2014/0328190 | A1 | 11/2014 | Lord et al. |
| 2015/0036663 | A1 | 2/2015 | Kilpatrick, II et al. |
| 2015/0215001 | A1 | 7/2015 | Eaves |
| 2016/0046387 | A1 | 2/2016 | Frolov et al. |
| 2016/0111877 | A1 | 4/2016 | Eaves et al. |
| 2016/0134331 | A1 | 5/2016 | Eaves |
| 2016/0191142 | A1 | 6/2016 | Boss et al. |
| 2016/0363457 | A1 | 12/2016 | Jelavic et al. |
| 2018/0077518 | A1 | 3/2018 | Nguyen et al. |

FOREIGN PATENT DOCUMENTS

| | | |
|---|---|---|
| EP | 2618601 A1 | 7/2013 |
| EP | 2938117 | 10/2015 |
| GB | 2532966 | 6/2016 |
| WO | WO-0201756 A1 | 1/2002 |
| WO | WO-02061971 A1 | 8/2002 |
| WO | WO-2009005875 A2 | 1/2009 |
| WO | WO-2013023171 A1 | 2/2013 |
| WO | WO-2014089329 A2 | 6/2014 |
| WO | WO-2015139733 A1 | 9/2015 |
| WO | WO-2016012055 A1 | 1/2016 |
| WO | WO-2018036870 A1 | 3/2018 |

OTHER PUBLICATIONS

Written Opinion, Application No. PCT/EP2018/070452, dated Jul. 5, 2019, 8 pages.
Ashutosh, Dhenke, *Extending Cell Tower Coverage through Drones*, Proceedings of the 18th International Workshop, Feb. 21, 2017, pp. 7-12.
Notification of International Preliminary Report on Patentability, Application No. PCT/EP2018/070452, dated Nov. 15, 2019, 9 pages.
International Search Report, Application No. PCT/EP2018/070452, dated Aug. 24, 2018, 3 pages.
3GPP TS 36.423 v12.1.0 (Mar. 2014), "Evolved Universal Terrestrial Radio Access Network (E-UTRAN), X2 application protocol (X2AP)," Technical Specification, 3rd Generation Partnership Project, Technical Specification Group Radio Access Network, (Release 12), 144 pages.
Application and Filing Receipt for U.S. Appl. No. 16/325,814, filed Feb. 2019, Inventor(s): Ghosh et al.
Broadband Forum, "TR-169 EMS to NMS Interface Requirements for Access Nodes Supporting TR-101," Issue: 1.0, Nov. 2008, 50 pages.
Chandrasekharan S., et al., "Designing and Implementing Future Aerial Communication Networks", IEEE Communications Magazine, May 2016, 9 pages.
Combined Search and Examination Report under Section 17 and 18(3) for GB Application No. 1616558.1, dated Mar. 8, 2017, 5 pages.
European Search Report for Application No. 15275100.4, dated Sep. 10, 2015, 8 pages.
Extended European Search Report for Application No. 16191547.5, dated Mar. 31, 2017, 14 pages.
GB Search Report for corresponding GB Application No. GB1614341.4, dated Feb. 2, 2017, 1 Page.
Han, et al., "Evaluation of Authentication Signaling Loads in 3GPP LTE/SAE Networks," 2009 IEEE, 34th Conference on Local Computer Networks (LCN 2009), Zurich, Switzerland, 978-1-4244-4487-8/09/, 2009 IEEE, Oct. 20-23, 2009, 8 pages.
He, T., et al., "VigilNet: An Integrated Sensor Network System for Energy-Efficient Surveillance," ACM Transactions on Sensor Networks, Acm, 2 Penn Plaza, Suite 701 New York NY 10121-0701 USA, vol. 2 (1), Feb. 2006, pp. 1-38.
Ho, et al., "Evolving Femtocell Coverage Optimization Algorithms using Genetic Programming," Bell Laboratories, Alcatel-Lucent, Swindon, UK, 978-1-4244-5213-4/09/, IEEE 2009, 5 pages.
International Preliminary Report on Patentability for Application No. PCT/EP2016/056353, dated Oct. 3, 2017, 7 pages.
International Preliminary Report on Patentability for Application No. PCT/EP2017/070690, dated Apr. 11, 2019, 8 pages.
International Preliminary Report on Patentability for Application No. PCT/EP2018/070486, dated Mar. 10, 2020, 7 pages.
International Search Report and Written Opinion for Application No. PCT/EP2017/070689, dated Oct. 11, 2017, 10 pages.
International Search Report and Written Opinion for Application No. PCT/EP2017/070690, dated Nov. 23, 2017, 14 pages.
International Search Report and Written Opinion for Application No. PCT/EP2018/070486, dated Oct. 24, 2018, 11 pages.
International Search Report for Application No. PCT/EP2016/056353, dated May 30, 2016, 3 pages.
Kolar J.W., et al., "Conceptualization and Multiobjective Optimization of the Electric System of an Airborne Wind Turbine," IEEE Journal of Emerging and Selected Topics in Power Electronics, vol. 1 (2), Jun. 2013, 31 pages.
Shao, Z., et al., "A Rapid and Reliable Disaster Emergency Mobile Communication System via Aerial Ad Hoc BS Networks", Wireless Communications, Networking and Mobile Computing (WICOM), 7th International Conference On, IEEE, Sep. 23, 2011, 4 pages.

(56) References Cited

OTHER PUBLICATIONS

Valcarce, A., et al., "Airborne Base Stations for Emergency and Temporary Events," In: Lecture Notes of the Institute for Computer Sciences, Social Informatics and Telecommunications Engineering, Springer, DE, vol. 123, Jun. 27, 2013, 12 pages.
Written Opinion for Application No. PCT/EP2016/056353, dated May 30, 2016, 6 pages.

\* cited by examiner

MOVING CELL BACKHAUL COORDINATION

This invention provides a solution to mobile network coverage challenge often referred to as "coverage hole" where there is no mobile network signal or the signal is weak.

Coverage holes occur for a number of reasons of economical and physical nature, or a mixture of both. For example, for remote areas a fibre broadband network deployment is particularly difficult to justify commercially due to combination of population density and the volume of required engineering works. A similar mix of techno-economic barriers occurs in cases of temporary high demand in mobile coverage, e.g. during music or sport events, or in natural disaster or emergency situations. Such areas of high demand are not always within a coverage of mobile network signal, representing inconvenience for potential users and a missed opportunity for operators. Even where mobile coverage is available, a temporary event may result in a requirement for greater capacity than the installed base station capacity can handle. Another application area is within research and scientific missions in remote areas where mobile connectivity is required for crew and equipment data exchange.

Autonomous or remotely controlled devices, sometimes known as "drones", are utilised in a number of situations where a piloted solution is unfeasible. They are also known as UAVs, UGVs, USVs or UUVs (unmanned aerial/ground/surface/underwater vehicles). Feasibility of autonomous vehicle applications has been demonstrated multiple times in recent years, using aerial drones for example. With significant momentum behind the technology, the unit price of such vehicles is expected to decrease while advanced intelligence solutions reduce in size in price as well. For example it is already possible to produce commodity base station under approx. 500 g (e.g. femtocell). Purpose-built autonomous vehicle solutions are expected to achieve even better technical characteristics.

Articles "Extending Cell Tower Coverage through Drones" (Dhekne et al, Hotmobile '17, https://experts.illinois.edu/en/publications/extending-cell-tower-coveraqe-through-drones and "Distributed Collaborative Path Planning in Sensor Networks with Multiple Mobile Sensor Nodes" (Lambrou et al, 17$^{th}$ Mediterranean Conference on Control & automation, Thessaloniki, June 2009) describe sensor nodes which are deployed in response to demand from mobile terminals in order to improve area coverage. Both the systems are driven by the detection of terminals requiring connection, and therefore would not be suitable for use in anticipation of demand. The second reference takes into account positions of fixed base stations, determined from a database, but does not take account of whether actual signal quality is already adequate, or whether the neighbouring base stations can be used for backhaul purposes. In particular, it does not take account of whether any other autonomous self-deploying nodes are operating in the vicinity.

A further reference GB2532966 describes a system in which a drone-mounted radio station operates as a relay between an existing base station and a mobile station, and moves in order to maximise the signal quality of that link.

According to the invention, there is provided a wireless access communications access point equipment, arranged to identify a location requiring improved wireless coverage and to move to that location, having a scanning system for detecting transmissions from one or more other wireless communications access points, a processor for determining a direction in which quality of coverage from the other wireless communications access points deteriorates, a navigation system for directing movement in the direction determined by the processor, and a propulsion and steering system for moving the access point equipment under the control of the navigation system.

The invention also provides a method of controlling an autonomous vehicle having wireless access communications access point equipment, comprising the steps of:
 scanning to detect transmissions from one or more other wireless communications access points,
 determining a direction in which quality of coverage from the other wireless communications access points deteriorates
 and directing the autonomous vehicle to move in the direction of decreasing coverage.

Unlike the prior art systems described above, the present invention does not rely on any co-operation with a mobile terminal, nor does it seek a location where a signal from a given base station is optimised, as is the case in the relay system described above. On the contrary, it seeks a location where signal quality is currently at a minimum, and does so without needing to take account of whether any mobile stations are currently present. The processor may identify a location in which it is at a limit of coverage provided by the other wireless access point, and to initiate operation as an access point at the location so identified. If the access point detects that it is at a limit of coverage of a wireless communications access point with which it is in communication, the access point may seek a handover to a further wireless communications access point and, if a handover is successful, to continue to move in a direction in which quality of coverage from the further access point deteteriorates, until a further handover is initiated or it reaches a limit of coverage provided by the other wireless access points The wireless communications access point equipment may identify a location in which quality of coverage provided by a plurality of other wireless access points is at a minimum, and (that is to say, that quality of coverage from each of the wireless access points is equally poor, so that movement towards any one of them would be to an area of better coverage, and then initiate operation as an access point at the minimum-quality location so is identified.

A backhaul relay communication may be set up through a wireless access point connected to the wireless communications access point equipment. A series of such access points may be used to establish a relay to a backhaul connection.

Quality of coverage may be measured as a function of one or more properties such as signal strength, bit error rate etc, or number of failed connection attempts (indicative that signal strength is adequate but capacity is limited)

The direction in which quality of coverage from the other access point decreases may be determined using a directional antenna, or it may be configured to direct the navigation system in a search pattern to identify the direction in which quality of coverage from the currently serving access point decreases.

The present invention is concerned with the deployment of an autonomous vehicle with navigation functionality and intelligence necessary to position the autonomous vehicle in a location where it can extend the radio network coverage, acting as a relay between an area where the coverage already exists and part of the "coverage hole" region. The vehicle itself may be an aerial, ground-based, floating or amphibious craft, depending on the nature of the terrain to be covered.

In the case of an aerial craft, it may be a lighter-than-air device or a winged aircraft, but in either case would be either tethered or have a control system to allow it to keep on station once deployed. Communications backhaul may be through a wireless connection or, if the device is tethered, through a connection associated with the tether. For airborne systems, where weight is an important constraint, power may also be supplied through a tether.

Embodiments of this invention allow economical and rapid provision of commercial services in the areas where full-scale permanent installation is financially or physically challenging, for example in regions affected by natural disaster or emergencies such as flood, fire or earthquake, or in remote but populated regions or remote scientific bases, or during special events such as festivals. They allow a high level of autonomy of deployed vehicles, as the optimum position for the vehicle is determined by the vehicle itself through its observation of the environment. Autonomy reduces the need for human intervention and is especially useful in cases where human time resources are limited as described above. As the network is deployed reactively, coverage can be optimised dynamically as conditions change—for example if a fixed base station in the area starts to transmit, or ceases to do so, the autonomous vehicle can move into a new position automatically to take account of the change in the environment. Similarly, if more than one autonomous vehicle is deployed in the same area, they will automatically seek out an optimum deployment configuration.

Figure 2:
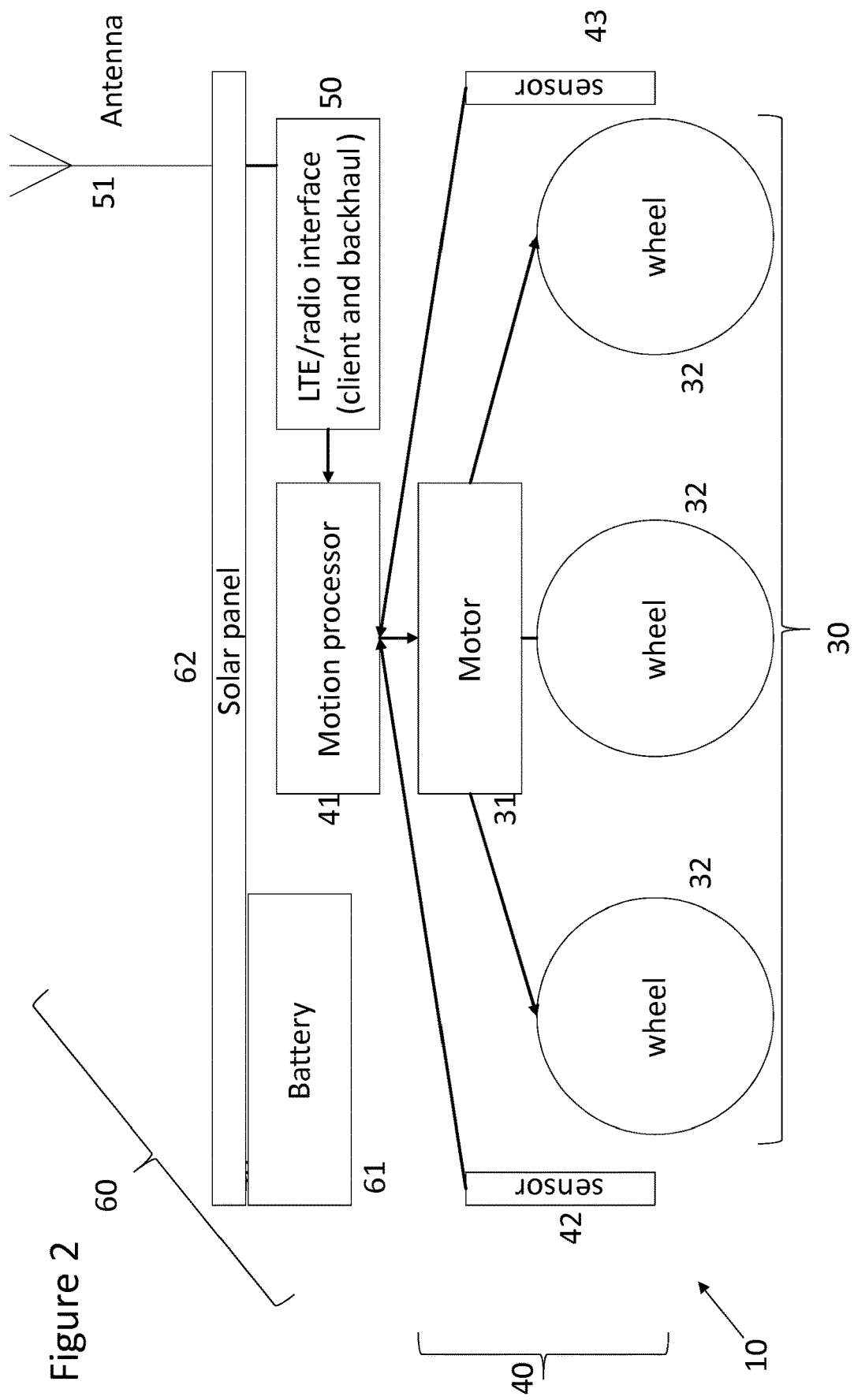
Figure 3:
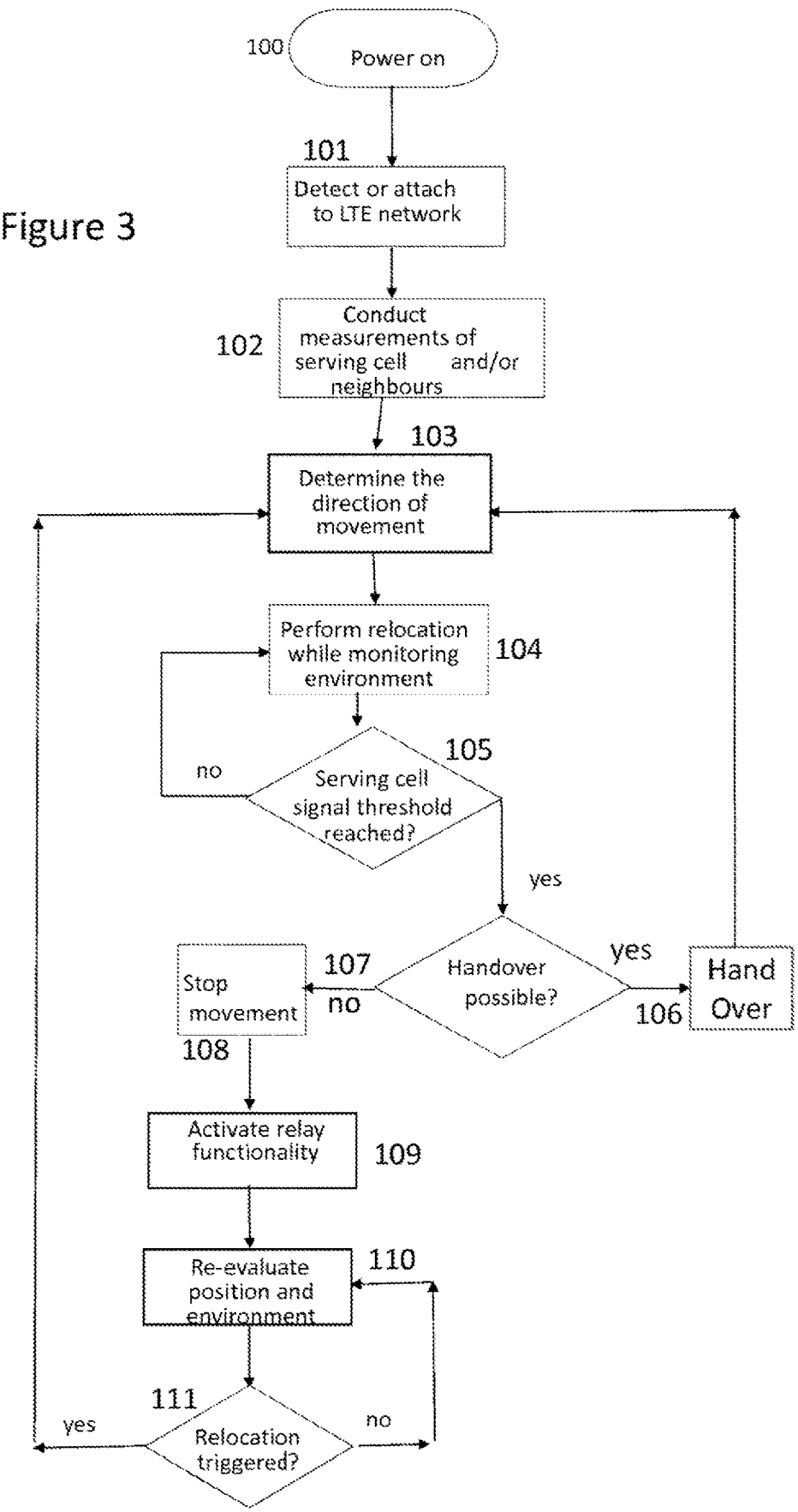
Figure 4:
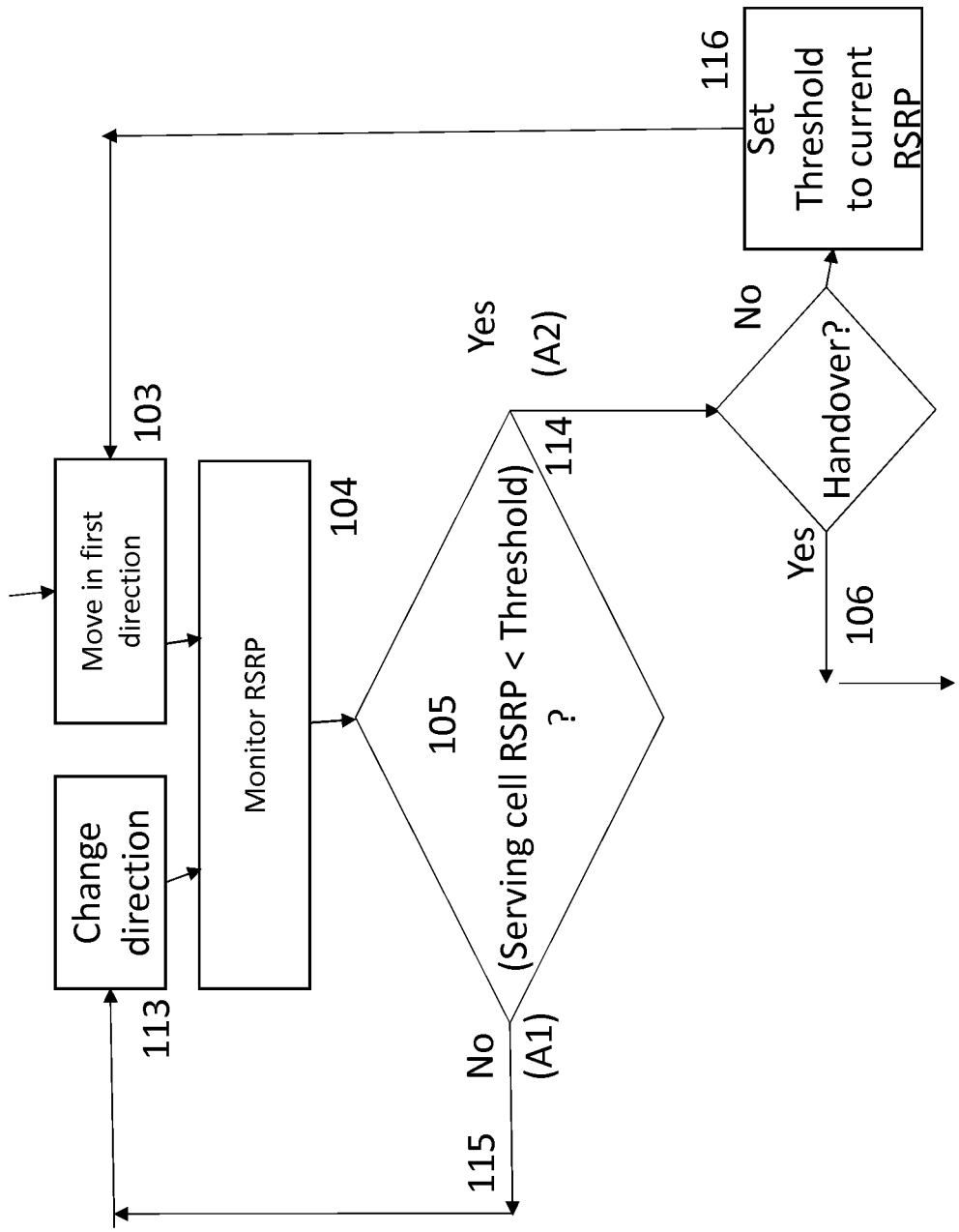

An embodiment of the invention will be described, by way of example, with reference to the drawings in which FIG. 1 depicts an illustrative scenario for deployment of autonomous vehicles FIG. 2 is a schematic diagram of an autonomous vehicle configured to operate according to the invention FIG. 3 is a flow diagram illustrating operation of an autonomous vehicle according to the invention FIG. 4 is a detail of part of the process depicted in FIG. 3

Figure 6:
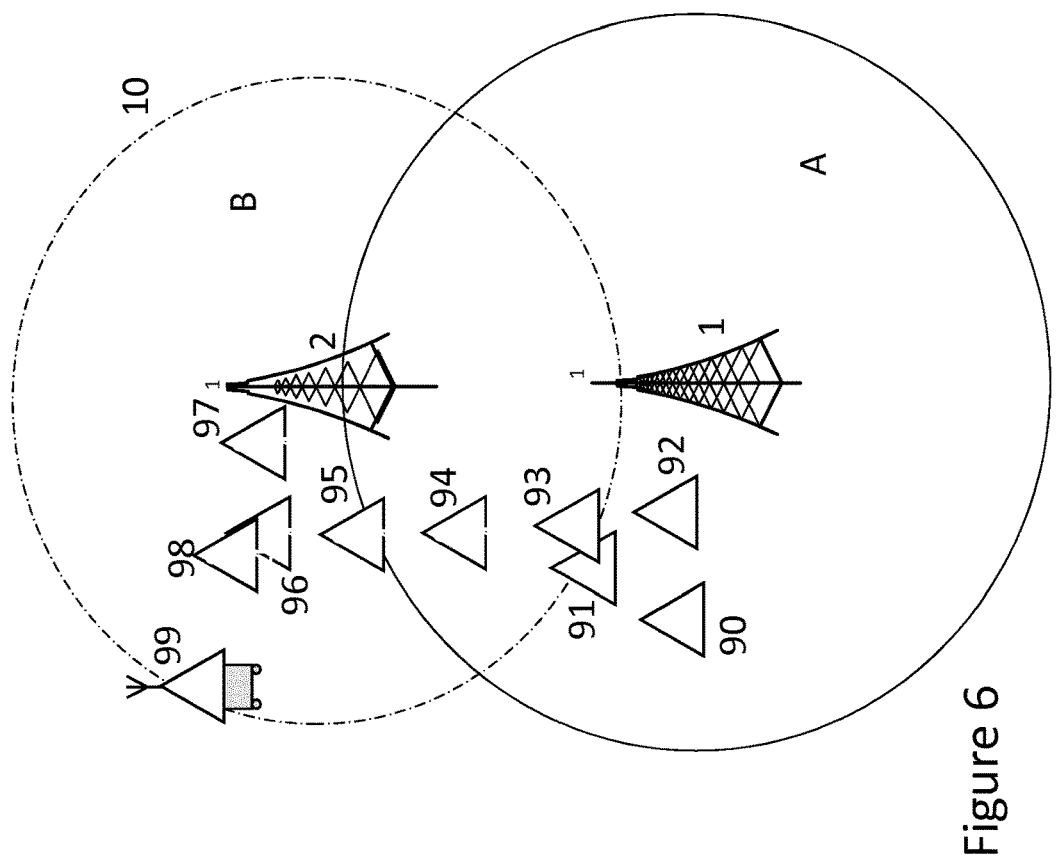
Figure 5:
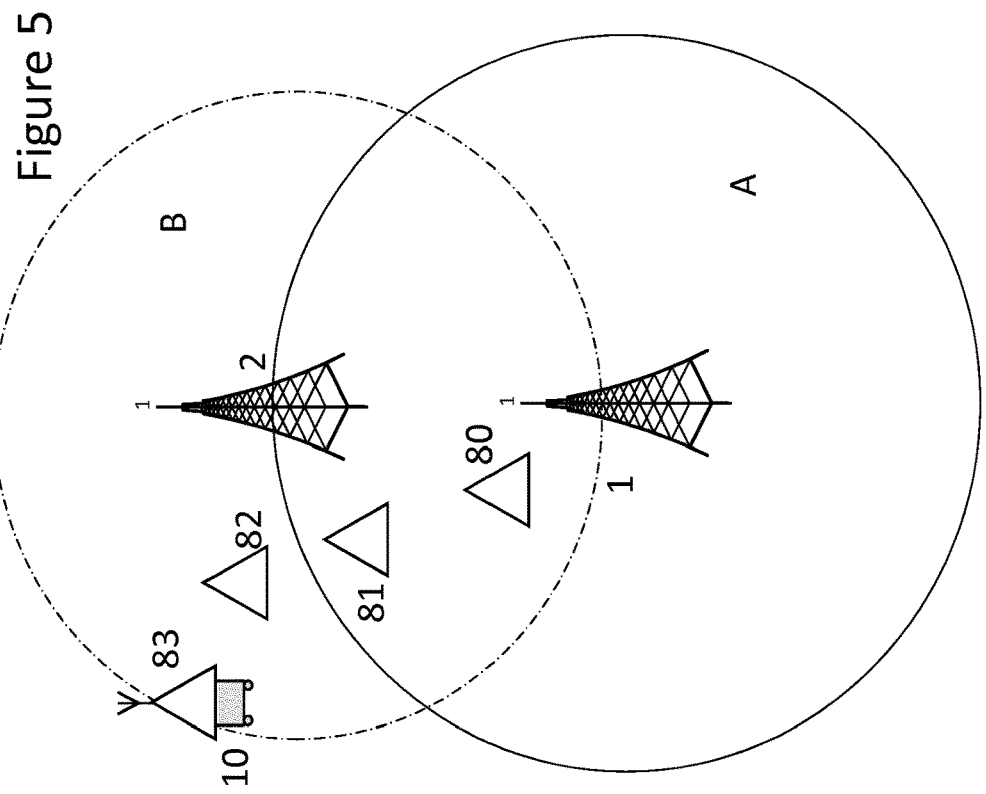

FIGS. 5 and 6 illustrate search strategies usable with the embodiments of the invention.

FIG. 1 describes a possible scenario for deployment of autonomous vehicles. In this example three base stations 1, 2, 3 provide coverage in respective cells A, B and C to form a permanent network, which is to be extended to provide service into a "coverage hole" D. It will be understood that the coverage area of a cell is not defined in practice by a clearly delineated circle, as signal quality diminishes over distance and topography and other factors can influence the range of a given base station in different directions. As illustrated by area E in FIG. 1, a "coverage hole" can also emerge in an area surrounded by coverage areas, yet no reliable is reception can be maintained.

FIG. 1 also depicts an autonomous vehicle 10 having an area of coverage depicted by the chain-dotted line 20. This autonomous vehicle can use the signal from an existing base station 1 as backhaul for the users that may be within its coverage area. Note that the coverage areas represented in the figure are for illustration purposes only, e.g. the coverage area of an autonomous vehicle may be comparable to the coverage area of the base station, or a base station coverage may be directed in a particular azimuthal sector, for example. In particular, with emerging beamforming functionality of LTE and 5G systems, the base station 1 may dedicate a beam for backhaul or direction of the autonomous vehicle 10 based on local or back-office functionality, which may work on top of the autonomous decision-making of the vehicle.

Further autonomous vehicles 11, 12 may "daisy-chain" to each other to provide an area 20, 21, 22 of continuous coverage within the "coverage hole" D. Potential interference between the autonomous vehicles in this case can be resolved using conventional methods, such as resource partitioning. FIG. 2 is a schematic diagram of an autonomous vehicle 10 configured to operate according to the invention. The principal functional elements are a vehicular platform 30, a motion processor 40, a radio module 50, and a power system 60.

The Vehicular platform 30 provides functions that enable the autonomous vehicle to change its position. In the case of a ground deployment this may comprise a motor 31 driving a number of wheels 32, and a suitable parking brake to retain the autonomous vehicle in position when at its selected location. In the case of deployment in water a motor would instead drive a propeller or impeller, and an anchor or other fixing device would be provided to secure the device in its selected location. In an airborne context, a motor would drive a propulsion system to be used to move the platform into position and then to keep station. Typically such a device would be tethered to a ground station to prevent it drifting away and to provide power.

The motion processor 40 comprises a processing unit 41 responsible for determining the is direction of travel based on inputs from sensors 42, 43 and from the radio interface 50. The sensors 42, 43 may be proximity sensors or other types of environment sensors to allow the vehicular platform to negotiate obstacles, whilst the radio input 50 provides data to the motion processor on received signal strength and other measures of channel quality.

The radio module 50 is also responsible for radio communication with the existing network 1, 2, 3 for provision of backhaul connectivity, for provision of signal to users in the autonomous vehicle's area of coverage 20, with the autonomous vehicle acting as a base station, and for peer-to-peer communication with other autonomous vehicles 11, 12 for purposes of backhaul or coordination. An antenna system 51 is connected to the module. This can comprise external, internal or retractable antennas, depending on the application. Separate antennas may be provided for the different communications functions. For example an omnidirectional (or azimuthal) antenna may be provided for communication with mobile terminals within the area of coverage, and for initial searching for a deployment location, and one or more directional antennas may be provided for backhaul and peer to peer functions.

The Power system 60 comprises a battery 61 associated with a solar panel 62 which can be deployed to provide power for movement and radio communication. Alternative embodiments may use an external power supply, for example through a tether between an aerial platform and a ground station. It will be recognised that the radio interface will only be in receiving mode during the search and movement phase, and will not require power for radio transmission until a location has been selected, after which, with the exception of aerial applications which may require power to maintain position, the vehicular system can be shut down.

FIG. 3 is a flow diagram illustrating a generalised process for operating of an autonomous vehicle according to the invention. The process will depend to some extent on the purpose for which the autonomous vehicle is to be deployed; for example a disaster-recovery case would differ in some respects from a music festival case, but FIG. 3 illustrates an overall strategy that an autonomous vehicle can follow. These procedures are implemented in the motion processor module 41, in response to inputs from the radio interface 50 and sensors 42, 43, and providing outputs to the traction system 30 and the radio interface 50. This process will be described as two main sub-processes 60, 70, respectively for determining the direction of travel and for relocation.

At power-on (step 100) the autonomous vehicle scans the environment and may attach to a network as a User Equipment (UE) (step 101), for example to download instructions. Otherwise, or if no connectivity to back-end systems is available, the autonomous vehicle may continue to operate with a default objective of extending the network coverage, as will be described below.

Following attachment, the autonomous vehicle performs a network scan (102) to collect observations of the environment, such as neighbour cells' identities and their received power levels.

These network environment observations are provided to the motion processor to decide the direction of movement for the autonomous vehicle (step 103). Other data such as GPS location may also be used if available. A basic search strategy is described here, but more advanced and sophisticated processes and methods can be provided to suit individual applications.

The principle of the default strategy is to move in the direction of the serving cell's signal quality decay (step 104), whilst continuing to monitor the serving cell's signal quality (step 105), and handing over to neighbour cells if available (step 106), continuing until no further handover candidate is available (step 107), and then stopping on the edge of coverage of the currently serving cell (step 108).

Other strategies can be realised, for example, following the principles of event-based measurement triggers utilised in LTE [TS36.331], where a serving base station signal is monitored for a set of events. FIG. 4 depicts the process of steps 103-106 in more detail, using such triggers. In this embodiment, the measurements are utilised to control the autonomous vehicle's motion processor 41. In particular, once in motion the drone may monitor the serving cell RSRP (step 104) and continue movement while conditions trigger LTE event A2, with appropriately-adjusted threshold and hysteresis value, remain true (step 114). The event A2 specified in the LTE standard is triggered when the serving cell becomes worse than threshold, i.e. Meas+Hyst<Threshold, where Hyst is a small hysteresis value to even out instantaneous fluctuations in measurements. The threshold in the case of this invention would be the previous measurement result (re-set at each iteration, step 116), so that the result of the difference Meas−Threshold would be negative. The adjustment of hysteresis can realised taking into account the specifics of the drone motion and terrain type to prevent the drone leaving the coverage area of the cell. Similarly, one tactical element of a strategy can be a change in the direction of moving (step 113) should event A1 be triggered (step 115—Event A1 is triggered when the serving cell becomes better than threshold.), indicating that the drone is approaching the serving cell's centre.

The determination of the direction of the serving station's decay may be achieved using a directional antenna which can determine in which direction the serving station lies, which data is used to direct the vehicle to move in the opposite direction. A simpler but slower system may use trial and error, by moving in a given direction, detecting the change in signal strength at the new location, and adjusting the direction of the next move quality according to whether the quality has increased, decreased, or stayed the same.

After stopping, the autonomous vehicle starts acting as a relay (step 109), providing services to users in its coverage area. The autonomous vehicle may use RSRP, LTE sync signals or other signal power or KPI to determine "signal quality" above. The autonomous vehicle can also be guided to the desired position through beamforming functionality implemented at the serving base station.

Such a procedure will mean that the autonomous vehicle will stop on the edge of coverage and extend the coverage into the coverage hole.

Re-evaluation of current position (step 110) can be performed periodically or in response to changes in the radio environment such as deterioration of the backhaul connection or installation of a permanent facility. Again, the details of the strategy will depend on the circumstances, but a default strategy may be installed in which the autonomous vehicle reacts to changes in the serving cell (or serving autonomous vehicle in case of daisy-chaining) (step 111) by moving further away if the signal becomes significantly better, however the autonomous vehicle would not retreat back if the signal becomes worse as this may break the chain to dependent autonomous vehicles further on in the coverage hole area. Therefore the threshold for the signal quality indicator above should be picked conservatively in this case.

Other cases are possible, for example the autonomous vehicles may launch a reconfiguration of the coverage by retreating back within coverage and re-starting the self-deployment process once again.

FIGS. 5 and 6 illustrate how autonomous vehicles according to respective first and second embodiments of the invention may seek a suitable location for deployment. The difference between the embodiments is in the search strategy used to identify the direction of the serving base station's signal decay (step 103 in FIG. 3). In the first embodiment, a directional antenna is used. In the second embodiment, an omnidirectional antenna is used, and the direction of decay determined by trial and error.

In FIGS. 5 and 6, two fixed base stations 1, 2 are present, and an autonomous vehicle 10 is seeking a suitable location at which to be deployed so that coverage may be extended. It will be noted that in this simplified example, the locations found (83, 99) are different in the two cases, but when several such autonomous vehicles are deployed the total coverage would tend towards a similar result in both cases. Successive locations found during the search are depicted by markers 80, 81, 82, 83; 90, 91, 92, 93 etc. . . . 99. In practice, detection and course correction would be undertaken over much shorter distances than illustrated in the Figures.

In the first example (FIG. 5), the autonomous vehicle starts at a location 80. It determines that it is in range of a base station 1 and attaches to that base station (step 101). It then measures the signal strength and direction of the base station (step 103) and having determined that it is not close to the threshold signal quality it moves in the direction away from the base station to a second position 81, where the autonomous vehicle determines that the signal quality has now deteriorated to below a threshold (step 105), and that a handover is possible to another base station 2 (step 106). Being now within range of the second base station the autonomous vehicle then moves to a third position 82. The direction of the second base station 2 is determined (step 103) and the autonomous vehicle moves in the opposite direction until it reaches location 83 at which the signal quality again falls to the threshold value (step 105). As in this case no further handover is possible (step 107) the autonomous vehicle 10 is stops (step 108) and activates its relay functionality 109.

In the second example (FIG. 6) the autonomous vehicle starts at a location 90. It determines that it is in range of a base station 1 and attaches to that base station (step 101). It then measures the signal strength of the base station (step 103) and having determined that it is not close to the threshold signal quality it moves to a second position 91, where the process is repeated. In this embodiment the radio interface does not have a directional capability and so the initial move is made in a random direction, although making use of inputs from the proximity sensors 42, 43. In this example the signal quality detected at the second location 91 is similar to that at the first location 90, indicating that the vehicle is "contouring" around the base station 1, so at one or more subsequent iterations (92, 93) different directions are attempted until a direction is discovered in which the signal quality deteriorates (step 94). Being still within range of the first base station the autonomous vehicle then continues to move in that direction until the autonomous vehicle reaches a position (95) where it determines that the signal quality has deteriorated to below a threshold (step 105), and that a handover is possible to another base station 2 (step 106). The autonomous vehicle then searches again for a direction to move (96, 97, 98) until it reaches a location 99 at which the signal quality again falls to the threshold value (step 105). As in this case no further handover is possible (step 107) the autonomous vehicle 10 stops (step 108) and activates its relay functionality 109.

It will be seen that the second search strategy is slower than the first, but does not require a directional antenna to identify the direction to travel.

Where there are multiple base stations, the search strategy will result in the mobile unit handing over between base stations according to which one is closest. It will eventually reach an equilibrium at a minimum point (such as "E" in FIG. 1) at which the signal quality (from one or other of the base stations) improves in any direction the unit can travel. This therefore identifies an optimum point for the temporary base station to be located.

The invention claimed is:

1. A wireless communications access point equipment, configured to identify a location requiring greater wireless coverage and to move to that location, and comprising:
    a scanning system for detecting transmissions from one or more other wireless communications access points;
    a processor for determining a direction in which quality of coverage from the one or more other wireless communications access points deteriorates;
    a navigation system for directing movement in the direction determined by the processor; and
    a propulsion and steering system for moving the wireless communications access point equipment under control of the navigation system,
    wherein the processor has provision to identify a location in which the wireless communications access point equipment is at a limit of coverage provided by another wireless communications access point, and to initiate operation as a wireless communications access point at the location so identified.

2. The wireless communications access point equipment according to claim 1, arranged to, when the processor detects that the wireless communications access point equipment is at a limit of coverage of another wireless communications access point with which the wireless communications access point equipment is in communication, seek a handover to a further wireless communications access point and, when the handover to the further wireless communications access point is completed, to continue to move in a direction in which quality of coverage from the further wireless communications access point deteriorates, until a further handover is initiated or the wireless communications access point equipment reaches a limit of coverage provided by the further wireless communications access point.

3. The wireless communications access point equipment according to claim 1, configured to establish a backhaul relay communication through a wireless communications access point connected to the wireless communications access point equipment.

4. The wireless communications access point equipment according to claim 1, wherein the processor has provision to identify a location in which quality of coverage provided by a plurality of other wireless communications access points is at a minimum, and to initiate operation as a wireless communications access point at the location so identified.

5. The wireless communications access point equipment according to claim 1, further comprising a directional antenna for detecting the direction in which quality of coverage from the one or more other wireless communications access points decreases.

6. The wireless communications access point equipment according to claim 1, wherein the processor is configured to direct the navigation system in a search pattern to identify the direction in which quality of coverage from a current wireless communications access point decreases.

7. The wireless communications access point equipment according to claim 1, configured to operate as a relay between one or more further wireless communications access points and a backhaul connection.

8. The method according to claim 7, wherein the wireless access communications access point equipment:
    establishes communication with a first wireless communications access point;
    determines a direction in which quality of coverage from the first wireless communications access point decreases;
    directs the autonomous vehicle to move in the direction of decreasing coverage quality;
    identifies a location at a limit of coverage provided by the first wireless communications access point;
    at the location so identified, attempts a handover to a second wireless communications access point;
    when the handover is completed, repeating the establishing, the determining, the directing, the identifying, and the attempting with the second and any subsequent wireless communications access points; and
    when the handover fails to be completed, initiates operation as a wireless communications access point.

9. A method of controlling an autonomous vehicle having wireless communications access point equipment, comprising:
    scanning to detect transmissions from one or more other wireless communications access points;
    determining a direction in which quality of coverage from the one or more other wireless communications access points deteriorates;
    directing the autonomous vehicle to move in the direction of decreasing coverage quality;
    identifying a location at a limit of coverage provided by the one or more other wireless communications access points; and
    initiating operation as a wireless communications access point at the location so identified.

10. The method according to claim 9, wherein the wireless communications access point equipment establishes a backhaul relay communication through the wireless communications access point with which the wireless communications access point equipment is currently in communication.

11. The method according to claim 9, wherein the wireless communications access point equipment identifies a location in which quality of coverage provided by a plurality of other wireless communications access points is at a minimum, and initiates operation as a wireless communications access point at the location so identified.

12. The method according to claim 9, wherein the determination of a direction in which quality of coverage from the other wireless communications access points decreases is performed by a scan with a directional antenna.

13. The method according to claim 9, wherein the determination of a direction in which quality of coverage from the other wireless communications access points decreases is performed by navigating in a search pattern to identify the direction in which quality of coverage from a currently serving wireless communications access point decreases.

14. The method according to claim 9, wherein a plurality of autonomous vehicles, each having respective wireless communications access point equipment, are deployed in sequence, each of the plurality of autonomous vehicles identifying a limit of wireless coverage provided by fixed wireless communications access points and any autonomous vehicles previously deployed, and initiating operation as a wireless communications access point at the limit of wireless coverage so identified.

15. The method according to claim 14, wherein the wireless access communications equipment associated with each of the plurality of autonomous vehicles communicate with each other to provide a relay network connected to a backhaul system through at least one fixed network access point in communication with one or more of the wireless access communications equipments.

* * * * *